(12) United States Patent
Quix et al.

(10) Patent No.: US 11,027,589 B2
(45) Date of Patent: Jun. 8, 2021

(54) ELECTRIC MOTOR WITH COOLING SYSTEM AND CORRESPONDING METHOD

(71) Applicant: Ford Global Technologies, LLC, Dearborn, MI (US)

(72) Inventors: Hans Guenter Quix, Herzogenrath (DE); Lars Kaufmann, Alfter (DE); Thomas Zenner, Dueren (DE); Mehmet Toeremis, Bergheim-Glessen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 16/375,916

(22) Filed: Apr. 5, 2019

(65) Prior Publication Data
US 2019/0308486 A1    Oct. 10, 2019

(30) Foreign Application Priority Data

Apr. 10, 2018  (DE) .......................... 102018205345.6

(51) Int. Cl.
*H01M 10/625*   (2014.01)
*B60H 1/00*   (2006.01)
*B60W 30/194*   (2012.01)

(52) U.S. Cl.
CPC ..... *B60H 1/00278* (2013.01); *B60H 1/00492* (2013.01); *B60H 1/00921* (2013.01); *B60W 30/194* (2013.01); *B60H 2001/00307* (2013.01)

(58) Field of Classification Search
CPC .............. H01M 10/625; H01M 10/613; H01M 6/5038; H01M 8/0267
See application file for complete search history.

(56) References Cited

U.S. PATENT DOCUMENTS

| 2,710,937 A * | 6/1955 | Godshalk ............ H01M 10/637 320/118 |
| 2005/0229873 A1* | 10/2005 | Willers .................... F02N 19/10 123/41.14 |
| 2012/0241120 A1* | 9/2012 | Hagel .................... F01M 5/001 165/10 |

(Continued)

FOREIGN PATENT DOCUMENTS

| DE | 102015103032 A1 | 9/2015 |
| DE | 112014003445 T5 | 5/2016 |
| DE | 102015106336 A1 | 10/2016 |

*Primary Examiner* — Olatunji A Godo
(74) *Attorney, Agent, or Firm* — David B. Kelley; Carlson, Gaskey & Olds, P.C.

(57) ABSTRACT

An example cooling system for an electric includes an electric motor having a supply opening for receiving coolant and a discharge opening for expelling coolant. The discharge opening is connected to the supply opening via a coolant circuit including a first return line in which a heat exchanger is arranged, a bypass line, and a second return line. The discharge opening is connected to the supply opening by both the first return line and the bypass line, and the bypass line bypasses the heat exchanger arranged in the first return line. A battery is arranged in the second return line, and the second return line is selectively connected to a short-circuit line which causes coolant to flow from a point downstream of the battery and return to the second return line upstream of the battery. Further, a heat accumulator is arranged in the short-circuit line.

17 Claims, 3 Drawing Sheets

(56) References Cited

U.S. PATENT DOCUMENTS

2013/0152614 A1* 6/2013 Traudt .................... B60L 58/27
                                                          62/196.1
2014/0353392 A1* 12/2014 Park ....................... B60H 1/143
                                                          237/12.3 B

* cited by examiner

ELECTRIC MOTOR WITH COOLING SYSTEM AND CORRESPONDING METHOD

RELATED APPLICATION(S)

This application claims priority to German Patent Application No. 102018205345.6, filed on Apr. 10, 2018, the entirety of which is herein incorporated by reference.

TECHNICAL FIELD

This disclosure relates to an electric motor with a cooling system and a corresponding method of using the same.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs). The traction battery is a relatively high-voltage battery that selectively powers the electric machines, and potentially other electrical loads of the electrified vehicle. The traction battery can include battery arrays each including a plurality of interconnected battery cells that store energy.

SUMMARY

A cooling system for an electric motor according to an exemplary aspect of the present disclosure includes, among other things, an electric motor having a thermal exchange feature with a supply opening for receiving coolant and a discharge opening for expelling coolant. The discharge opening is connected to the supply opening via a coolant circuit, and the coolant circuit includes a first return line in which a heat exchanger is arranged, a bypass line, and a second return line. The discharge opening is connected to the supply opening by both the first return line and the bypass line, and the bypass line bypasses the heat exchanger arranged in the first return line. A battery is arranged in the second return line, and the second return line is selectively connected to a short-circuit line which causes coolant to flow from a point downstream of the battery and return to the second return line upstream of the battery. Further, a heat accumulator is arranged in the short-circuit line.

In a further non-limiting embodiment of the foregoing cooling system, a flow regulator is arranged at the point downstream of the battery and is configured to selectively fluidly couple the second return line to the short-circuit line.

In a further non-limiting embodiment of any of the foregoing cooling systems, a pump is arranged in the short-circuit line.

In a further non-limiting embodiment of any of the foregoing cooling systems, a coolant-operated vehicle interior heating system is arranged in the second return line upstream of the battery.

In a further non-limiting embodiment of any of the foregoing cooling systems, a backflow prevention valve is arranged downstream of the coolant-operating vehicle interior heating system and upstream of the battery.

In a further non-limiting embodiment of any of the foregoing cooling systems, the second return line returns to the bypass line.

In a further non-limiting embodiment of any of the foregoing cooling systems, the heat accumulator is electrically heatable.

In a further non-limiting embodiment of any of the foregoing cooling systems, the heat accumulator is configured to store heated coolant and is thermally insulated.

In a further non-limiting embodiment of any of the foregoing cooling systems, the discharge opening is selectively connected to the heat accumulator via a heating line.

In a further non-limiting embodiment of any of the foregoing cooling systems, the bypass line branches off from the main return line at a nodal point, and a thermostat valve is arranged at the nodal point.

In a further non-limiting embodiment of any of the foregoing cooling systems, the electric motor is a used to drive a motor vehicle.

In a further non-limiting embodiment of any of the foregoing cooling systems, the battery is a traction battery.

In a further non-limiting embodiment of any of the foregoing cooling systems, wherein the thermal exchange feature is a thermal jacket arranged relative to the electric motor. Further, the supply opening is configured to permit fluid to enter the thermal jacket, and the discharge opening is configured to direct fluid to flow out of the thermal jacket.

A method according to an exemplary aspect of the present disclosure includes, among other things, charging a heat accumulator with waste heat from an electric motor, and discharging the heat accumulator to heat a battery.

In a further non-limiting embodiment of the foregoing method, the charging step includes directing coolant from an electric motor to a heat accumulator via a heating line.

In a further non-limiting embodiment of any of the foregoing methods, the discharging step includes directing coolant from the heat accumulator to the battery via a short-circuit line. The heat accumulator is arranged in the short-circuit line.

In a further non-limiting embodiment of any of the foregoing methods, the heating line is connected to the short-circuit line upstream of the heat accumulator.

In a further non-limiting embodiment of any of the foregoing methods, the discharging step includes running a pump arranged in the short-circuit line.

In a further non-limiting embodiment of any of the foregoing methods, the short-circuit line is provided between a first point downstream of a battery and a second point upstream of the battery.

In a further non-limiting embodiment of any of the foregoing methods, a flow regulator is arranged at the first point and is configured to selectively connect a bypass line to the short-circuit line. The battery is arranged in the bypass line, and the bypass line is ultimately connected to the electric motor.

DETAILED DESCRIPTION

Figure 1:
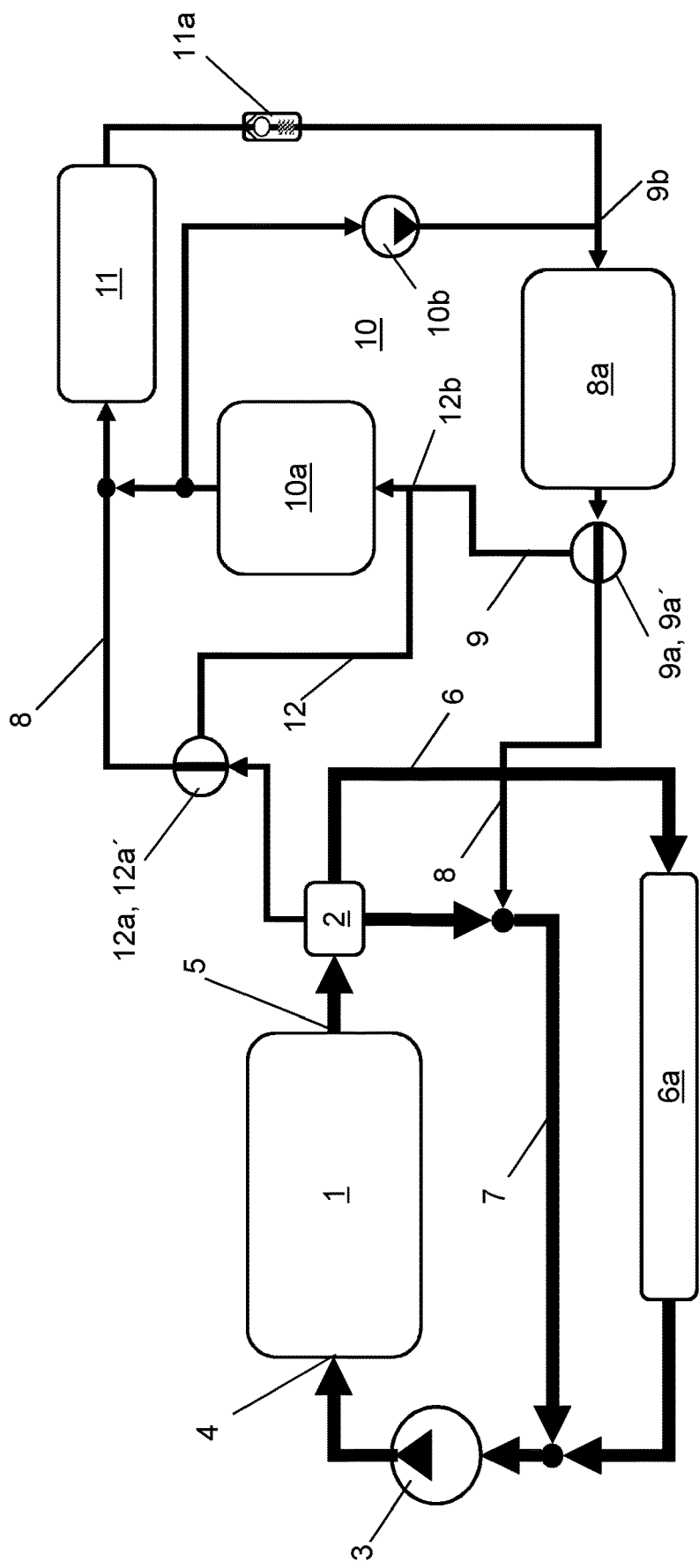
FIG. 1 schematically illustrates an example electric motor and cooling system in a first operating mode.

This disclosure relates to an electric motor with a cooling system and a corresponding method of using the same. A cooling system for an electric motor according to an exemplary aspect of the present disclosure includes, among other things, an electric motor having a thermal exchange feature with a supply opening for receiving coolant and a discharge opening for expelling coolant. The discharge opening is connected to the supply opening via a coolant circuit, and the coolant circuit includes a first return line in which a heat exchanger is arranged, a bypass line, and a second return line. The discharge opening is connected to the supply opening by both the first return line and the bypass line, and the bypass line bypasses the heat exchanger arranged in the first return line. A battery is arranged in the second return line, and the second return line is selectively connected to a short-circuit line which causes coolant to flow from a point downstream of the battery and return to the second return line upstream of the battery. Further, a heat accumulator is arranged in the short-circuit line. The disclosure also relates to a method of use. Among other benefits (which will be appreciated from the below description), this disclosure efficiently manages temperatures of the electric motor and battery and permits operation of the same even in cold temperatures.

This disclosure relates to an electric motor with a liquid cooling system, in which the electric motor is equipped with a thermal exchange feature, such as a thermal jacket (i.e., a coolant jacket). The coolant jacket has a supply opening on the inlet side for supplying coolant and a discharge opening on the outlet side for discharging the coolant. The discharge opening is at least connectable to the supply opening to form a coolant circuit. Further, the discharge opening is connectable to the supply opening via a first return line in which a heat exchanger is arranged, and the discharge opening is also connectable to the supply opening via a bypass line, which bypasses the heat exchanger arranged in the first return line. This disclosure also relates to demonstrating the use of such an electric motor and the corresponding cooling system.

An electric motor of the type mentioned above is used for example as a motor vehicle drive. If the electric motor serves as a motor vehicle drive, the drive can comprise further torque sources, in addition to the electric motor, for driving the motor vehicle, for example an internal combustion engine or an electrified vehicle, which provides additional power and can be drive-connected to the electric motor. Electric motors are regularly equipped with a liquid cooling system. Moreover, the waste heat can be more easily supplied for another use if a liquid cooling system is used for cooling purposes. The purpose and object of a liquid cooling system are not for heat to be extracted from the electric motor in the highest quantities possible and discharged to the environment. Instead, the aim is to achieve needs-based cooling wherein the waste heat should advantageously be utilized further.

In motor vehicles which use an electric motor drive or have a battery-electric drive, a cold start in adverse environmental conditions, in particular at temperatures below the freezing point, presents a technological challenge since the available battery power decreases rapidly as the temperature drops. Below a critical temperature limit, the vehicle can generally no longer be operated electrically. This is because it is necessary to supply energy from the outside to heat up the battery so that the functionality of the battery can be ensured and starting or operation of the electric motor is enabled. In this case, it is disadvantageous that the electric motor can only be started with a time delay after the battery has been heated up.

The object of the present disclosure is to provide an electric motor in which the functionality of the battery is also ensured in chilly environmental conditions, in particular at temperatures below the freezing point.

Another object pertains to a method of use, in which the electric motor is equipped with a thermal exchange feature such as at least one coolant jacket. This coolant jacket has a supply opening on the inlet side for supplying coolant and a discharge opening on the outlet side for discharging the coolant, and the discharge opening is at least connectable (i.e., capable of being fluidly coupled to) to the supply opening to form a coolant circuit. The discharge opening is at least connectable to the supply opening via a first return line in which a heat exchanger is arranged, and the discharge opening is at least connectable to the supply opening via a bypass line, which bypasses the heat exchanger arranged in the first return line. Further, the discharge opening is at least connectable to the supply opening via a second return line, in which there is arranged a battery to which coolant is applied, and, to form a secondary circuit, a short-circuit line is provided, by way of which the second return line downstream of the battery is at least connectable to the second return line upstream of the battery and in which a heat accumulator is arranged.

The electric motor and/or its liquid cooling system possesses a heat accumulator, which is designed for storing heated coolant and, together with the battery, forms a secondary circuit of the liquid cooling system.

According to this disclosure, coolant can circulate in the secondary circuit via a short-circuit line, in which heated coolant coming from the heat accumulator is used to heat the battery. The heated coolant can be coolant which is heated during operation of the electric motor. The waste heat accumulating during operation of the electric motor would thus be used, and the coolant heated by way of the waste heat is temporarily stored in the heat accumulator for later use, namely heating the battery.

The heating up of the battery could take place for example before a cold start of the drive. As an example, it could be carried out as a preparatory measure before starting the electric motor.

If the battery is a high-performance battery, for example a lithium-ion battery, which regularly undergoes liquid cooling, synergies advantageously arise since such a battery can be integrated (i.e., incorporated) in the coolant circuit of the liquid cooling system of the electric motor.

The battery of the electric motor according to this disclosure is also a component of the liquid cooling system. In particular, it is incorporated in the coolant circuit of the liquid cooling system, namely in the second return line.

The waste heat of the electric motor can also be supplied for another use. The waste heat can be used, for example, for heating the interior so that this does not have to be done electrically. The electrical energy would otherwise have to be taken from the battery itself, whereby the range in the electric motor operation would be considerably reduced. In this case, the heating of the interior could take place using warm coolant stored in the heat accumulator. For rapid heating of the passenger compartment following a cold start, this would constitute an appreciable advantage in terms of comfort.

Another object on which this disclosure is based is achieved by the electric motor according to this disclosure, namely an electric motor is provided in which the functionality of the battery is also ensured in chilly environmental conditions, in particular at temperatures below the freezing point.

Where it is stated within the scope of the present disclosure that openings, lines or other components of the cooling circuit are at least connectable, this is to be interpreted such that either a permanent connection exists or a connection can be brought about, for example through the actuation of a flow regulator or valve. A connection of the coolant circuit at a particular instant is referred to below. The term "fluidly coupled" is also used in this disclosure to refer to fluid connections. The terms "selectively fluidly coupled" or "selectively connected" means that a fluid connection is capable of being formed by actuation of a valve, for example.

Further advantageous embodiments of the electric motor are described in more detail below. In this case, it will, in particular, become clear to one of ordinary skill in the art how the coolant flows are established and conducted and which lines of the circuits are opened and blocked and which effects and impacts advantageously arise therefrom.

Embodiments of the electric motor are advantageous in which the short-circuit line branches off from the second return line downstream of the battery, forming a first nodal point. The coolant coming from the battery can then be taken from the second return line immediately downstream of the battery and supplied to the short-circuit line. In this connection, embodiments of the electric motor are advantageous in which a first flow regulator is arranged at the first nodal point.

A 3/2-way valve, which has three connections and two switching positions, can serve as the first flow regulator. In a first switching position, the short-circuit line would be blocked and the second return line would be opened and, in a second switching position, the second return line would be blocked and the short-circuit line would be opened.

Embodiments of the electric motor are advantageous in which the short-circuit line leads into the second return line upstream of the battery, forming a second nodal point. A further heat exchanger, for example a coolant-operated vehicle interior heating system, is advantageously not located between the second nodal point and the battery, which means that the heat coming from the heat accumulator is directly available to the battery without prior use.

Embodiments of the electric motor are advantageous in which a pump is arranged in the short-circuit line. The pump ensures that the coolant circulates in the secondary circuit and heat can be introduced into the battery. While the coolant flow in the main circuit can be delivered by way of a mechanically driven water pump, an electrically operated pump is provided in the secondary circuit if the drive comprises, for example, an internal combustion engine in addition to the electric motor as a further torque source for driving purposes. Although this additional pump in the secondary circuit increases the costs and the spatial requirement of the liquid cooling system, it is necessary for providing the benefit of heating up the battery as a preparatory measure before starting the electric motor. Nevertheless, the pump in the main circuit can likewise be an electrically operated pump.

Embodiments of the electric motor are advantageous in which a coolant-operated vehicle interior heating system is arranged in the second return line upstream of the battery. For the sake of comfort, it can be advantageous or desirable, in particular following a cold start, to provide a coolant-operated vehicle interior heating system with heated coolant, for example, with coolant heated by the electric motor. In some circumstances, it would be necessary to provide an additional coolant line, which branches off from the heat accumulator and leads into the second return line upstream of the coolant-operated vehicle interior heating system, forming a nodal point.

If a coolant-operated vehicle interior heating system is arranged upstream of the battery, embodiments of the electric motor are advantageous in which a non-return valve (i.e., backflow prevention valve) is arranged between the battery and the coolant-operated vehicle interior heating system. Coolant circulating in the secondary circuit is then unable to make its way, or flow back, into the vehicle interior heating system via the second return line.

Embodiments of the electric motor are advantageous in which a pump for delivering coolant to the supply opening is provided upstream of the supply opening. The pump ensures that the coolant circulates in the coolant circuit and heat can be transferred into the individual heat exchangers or the at least one coolant jacket of the electric motor or the battery. Embodiments of the electric motor are advantageous in which the pump is variably controllable so that the coolant flow rate can be influenced by way of delivery pressure.

After exiting from the discharge opening, the coolant conducted through the electric motor can be returned to the inlet side optionally via a return line or via a bypass line, where, if desired, heat can be extracted from the coolant in a heat exchanger arranged in the return line. The control of this coolant flow can be assumed by a thermostat valve provided downstream of the discharge opening.

Therefore, embodiments of the electric motor are also advantageous in which the bypass line branches off from the first return line, forming a nodal point, wherein a thermostat valve is arranged at the nodal point. While a thermostat valve has a characteristic opening temperature and is a self-regulating valve, flow regulators which are actively adjustable, switchable or continuously variably adjustable may be used in the present case.

Embodiments of the electric motor are advantageous in which the heat accumulator is electrically heatable. The coolant can then be actively heated by way of an external heating device. However, a heating device is an additional consumer, whereby the efficiency of the electric motor or the drive is reduced. Other inventive concepts provide for storing the coolant heated during operation in an insulated heat accumulator and using it in the case of a restart, wherein the coolant heated during operation can be kept at a high temperature for a limited amount of time. Therefore, embodiments of the electric motor are also advantageous in which the heat accumulator is equipped with thermal insulation. As already mentioned several times, embodiments of the electric motor are advantageous in which the heat accumulator is designed for storing heated coolant.

Embodiments of the electric motor are advantageous in which the discharge opening is at least connectable to the heat accumulator via a heating line. After exiting from the discharge opening, the coolant conducted through the electric motor can then be returned to the heat accumulator via the heating line, whereby charging of the accumulator with heated coolant takes place to a certain extent during the operation of the electric motor. The control of this coolant flow can take place downstream of the discharge opening using a further flow regulator; optionally with the addition of a thermostat valve or the provided thermostat valve.

Embodiments of the electric motor are advantageous in which an additional heat exchanger is provided in the coolant circuit. The additional heat exchanger can be a coolant-operated cooling device of an exhaust gas return system, for example, by way of which the coolant is additionally heated and which can therefore serve as an additional heat source.

Yet another object on which this disclosure is based, namely to demonstrate the use of an electric motor of the type described above, is achieved in that the electric motor is used as a motor vehicle drive. Advantageous uses involve using a hybrid drive as the motor vehicle drive, which hybrid drive comprises at least one further torque source, in addition to the electric motor, for driving the motor vehicle, for example.

Now specifically turning to the drawings, FIG. 1 schematically illustrates an example electric motor 1 with a cooling system in a first operating mode. The electric motor 1 is representative of a known type of electric machine configured for use in an electrified vehicle. In particular, in this example, the cooling system is a liquid cooling system.

In this disclosure, the electric motor 1 is equipped with a coolant jacket or another type of thermal exchange feature, and the coolant jacket has a supply opening 4 on the inlet side for supplying coolant and a discharge opening 5 on the outlet side for discharging the coolant. Generally, the coolant jacket surrounds the electric motor 1 and permits coolant to flow around the motor in close proximity thereto to absorb heat from the electric motor 1.

To form a coolant circuit, the discharge opening 5 is connectable to the supply opening 4 on the one hand via a first return line 6, in which a heat exchanger 6a is arranged, and on the other via a bypass line 7 which bypasses the heat exchanger 6a. The bypass line 7 branches off from the first return line 6, forming a nodal point. A thermostat valve 2 is arranged at the nodal point, at which a thermostat valve 2 opens either the first return line 6 or the bypass line 7 for the coolant depending on the coolant temperature at that particular instant.

A pump 3 for delivering the coolant is provided upstream of the supply opening 4.

In the present case, the discharge opening 5 is also connectable to the supply opening 4 via a second return line 8, in which there is arranged a battery 8a to which coolant is applied. The battery 8a The second return line 8 begins at the thermostat valve 2 and ultimately returns to the bypass line 7.

A coolant-operated vehicle interior heating system 11 is arranged upstream of the battery 8a. A backflow prevention device, such as a non-return valve 11a, which prevents a backflow of coolant, is arranged between the battery 8a and the coolant-operated vehicle interior heating system 11.

To form a secondary circuit 10, a short-circuit line 9 is provided. Specifically, in FIG. 1, the short-circuit line 9 branches off from the second return line 8 immediately downstream of the battery 8a, forming a first nodal point 9a, and leads back into the second return line 8 immediately upstream of the battery 8a—between the nonreturn valve 11a and the battery 8a—forming a second nodal point 9b.

A heat accumulator 10a and a pump 10b for delivering the coolant in the secondary circuit 10 are arranged in the short-circuit line 9. The heat accumulator 10a is designed for storing heated coolant. The heated coolant can be coolant which is heated during operation of the electric motor 1, but it can also be coolant which is heated by way of an external heating system (not illustrated).

A first flow regulator 9a' is arranged at the first nodal point 9a. In the present case, a 3/2-way valve (i.e., a 3-way, 2-position valve), which comprises three connections and 2 switching positions, serves as the first flow regulator 9a'.

In the first operating mode of the electric motor 1 according to FIG. 1, the short-circuit line 9 is blocked and the second return line 8 is opened.

Figure 2:
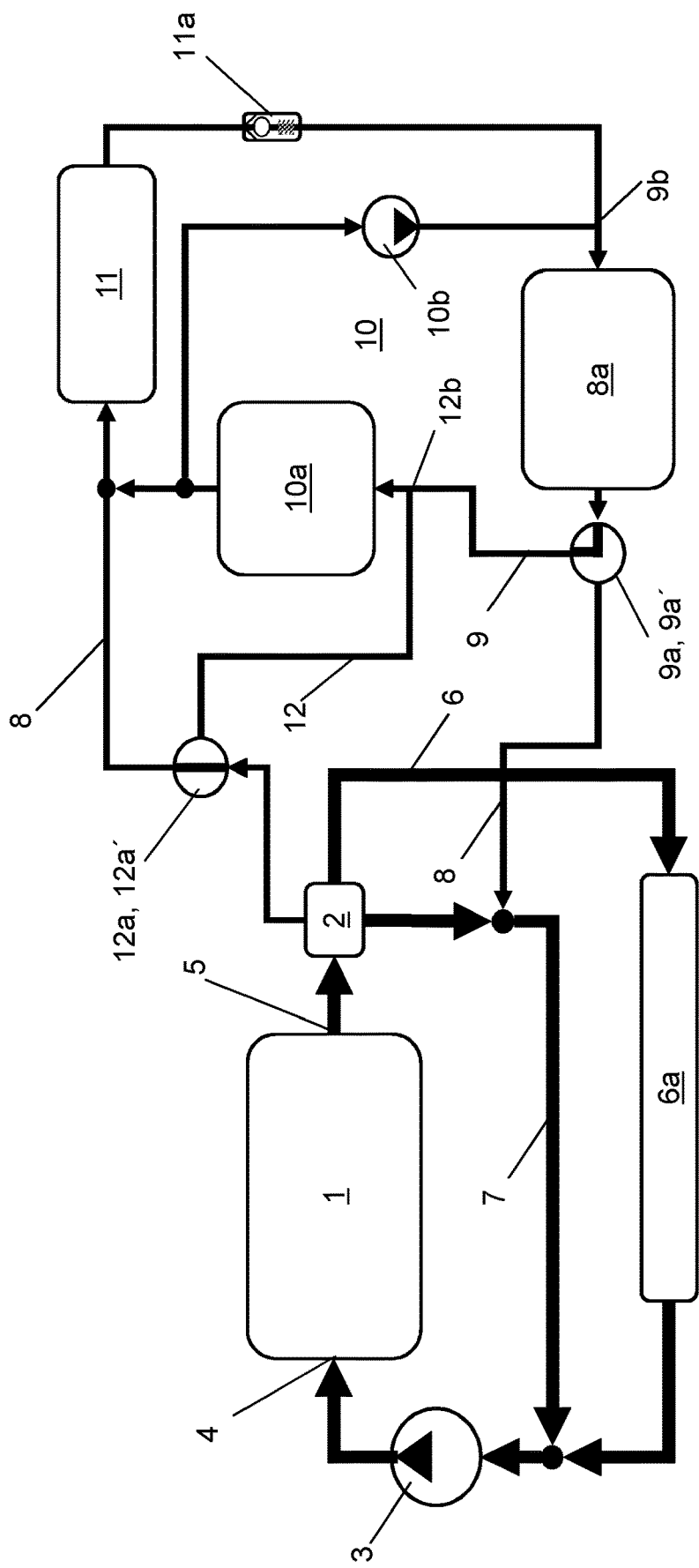
FIG. 2 schematically illustrates the electric motor and cooling system in a second operating mode.

In the second operating mode of the electric motor 1 according to FIG. 2, the second return line 8 is blocked and the short-circuit line 9 is opened. In this operating mode, coolant can circulate in the secondary circuit 10 via the short-circuit line 9, wherein warm coolant coming from the heat accumulator 10a is used to heat the battery 8a.

Figure 3:
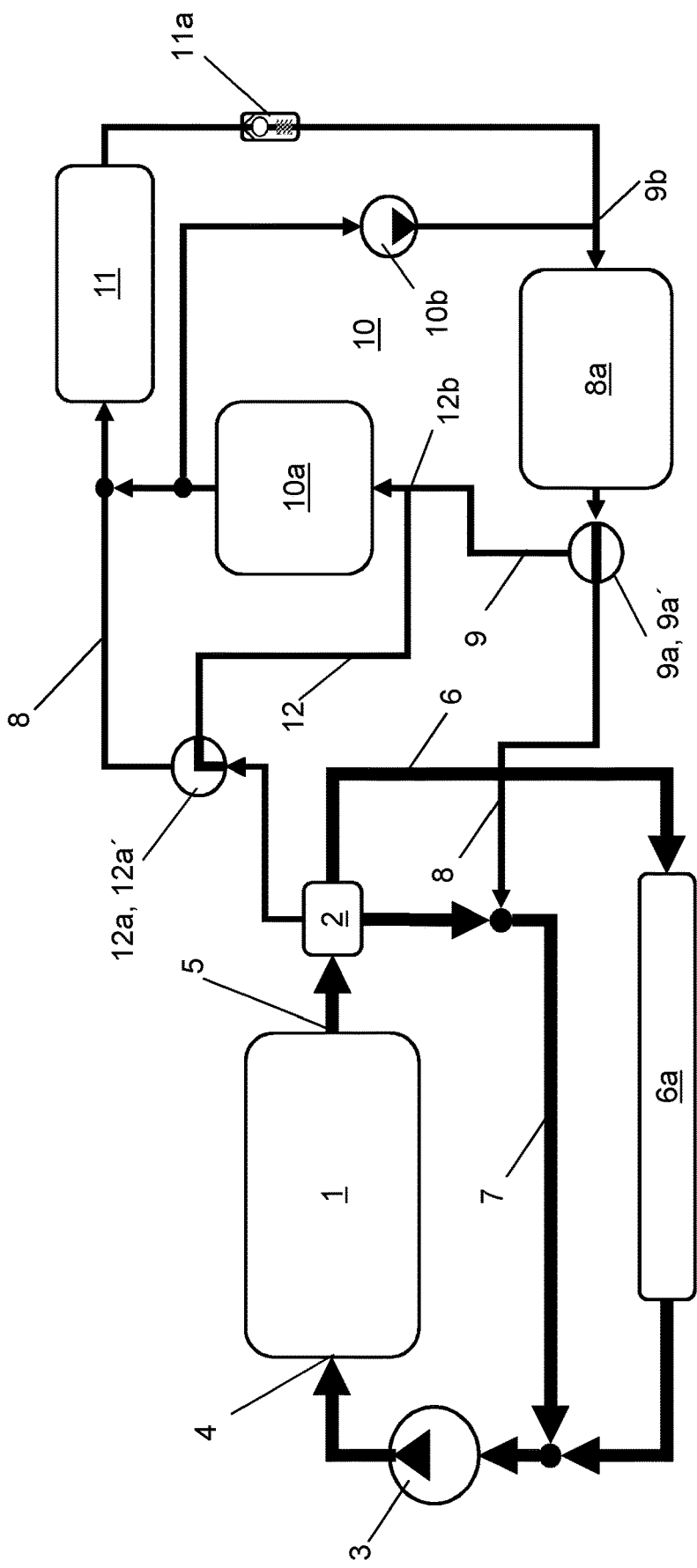
FIG. 3 schematically illustrates the electric motor and cooling system in a third operating mode.

In FIG. 3, the discharge opening 5 is connected to the heat accumulator 10a via a heating line 12. Specifically, the heating line 12 branches off from the second return line 8, forming a third nodal point 12a, and leads into the short-circuit line 9 upstream of the heat accumulator 10a, forming a fourth nodal point 12b.

A second flow regulator 12a' is arranged at the third nodal point 12a. A 3/2-way valve serves as the second flow regulator 12a'. In the third operating mode of the electric motor 1 according to FIG. 3, the second return line 8 is blocked and the heating line 12 is opened.

After exiting from the discharge opening 5, the coolant conducted through the electric motor 1 is returned to the heat accumulator 10a via the heating line 12, whereby a charging of the accumulator 10a with heated coolant takes place to a certain extent during the operation of the electric motor 1 in the third operating mode. In this case, the provided thermostat valve 2 opens the second return line 8.

Directional terms such as "fore," "aft," "transverse," "longitudinal," "vertical," "front," "rear," "side," etc., are used herein with reference to the normal operational attitude of a motor vehicle. It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A cooling system for an electric motor, comprising:
   an electric motor having a thermal exchange feature with a supply opening for receiving coolant and a discharge opening for expelling coolant, wherein:
   the discharge opening is connected to the supply opening via a coolant circuit,
   the coolant circuit includes a first return line in which a heat exchanger is arranged, a bypass line, and a second return line,
   the discharge opening is connected to the supply opening by both the first return line and the bypass line,
   the bypass line bypasses the heat exchanger arranged in the first return line,
   a battery is arranged in the second return line, and
   the second return line is selectively connected to a short-circuit line which causes coolant to flow from a point downstream of the battery and return to the second return line upstream of the battery, and
   a heat accumulator is arranged in the short-circuit line.

2. The cooling system as recited in claim 1, wherein a flow regulator is arranged at the point downstream of the battery and is configured to selectively fluidly couple the second return line to the short-circuit line.

3. The cooling system as recited in claim 1, wherein a pump is arranged in the short-circuit line.

4. The cooling system as recited in claim 1, wherein a coolant-operated vehicle interior heating system is arranged in the second return line upstream of the battery.

5. The cooling system as recited in claim 4, wherein a backflow prevention valve is arranged downstream of the coolant-operating vehicle interior heating system and upstream of the battery.

6. The cooling system as recited in claim 1, wherein the second return line returns to the bypass line.

7. The cooling system as recited in claim 1, wherein the heat accumulator is electrically heatable.

8. The cooling system as recited in claim 1, wherein the heat accumulator is configured to store heated coolant and is thermally insulated.

9. The cooling system as recited in claim 1, wherein the discharge opening is selectively connected to the heat accumulator via a heating line.

10. The cooling system as recited in claim 1, wherein the bypass line branches off from the first return line at a nodal point, and a thermostat valve is arranged at the nodal point.

11. The cooling system as recited in claim 1, wherein the electric motor is a used to drive a motor vehicle.

12. The cooling system as recited in claim 11, wherein the battery is a traction battery.

13. The cooling system as recited in claim 1, wherein the thermal exchange feature is a thermal jacket arranged relative to the electric motor, the supply opening configured to permit fluid to enter the thermal jacket, and the discharge opening configured to direct fluid to flow out of the thermal jacket.

14. A method, comprising:
 charging a heat accumulator with waste heat from an electric motor; and
 discharging the heat accumulator to heat a battery,
 wherein the charging step includes directing coolant from an electric motor to a heat accumulator via a heating line,
 wherein the discharging step includes directing coolant from the heat accumulator to the battery via a short-circuit line, the heat accumulator is arranged in the short-circuit line, and
 wherein the discharging step includes running a pump arranged in the short-circuit line.

15. The method as recited in claim 14, wherein the heating line is connected to the short-circuit line upstream of the heat accumulator.

16. A method, comprising:
 charging a heat accumulator with waste heat from an electric motor; and
 discharging the heat accumulator to heat a battery,
 wherein the charging step includes directing coolant from an electric motor to a heat accumulator via a heating line,
 wherein the discharging step includes directing coolant from the heat accumulator to the battery via a short-circuit line, the heat accumulator is arranged in the short-circuit line, and
 wherein the short-circuit line is provided between a first point downstream of a battery and a second point upstream of the battery.

17. The method as recited in claim 16, wherein a flow regulator is arranged at the first point and is configured to selectively connect a bypass line to the short-circuit line, the battery is arranged in the bypass line and the bypass line is ultimately connected to the electric motor.

\* \* \* \* \*